United States Patent
Huang et al.

[11] Patent Number: 6,032,368
[45] Date of Patent: Mar. 7, 2000

[54] APPLE CORER

[75] Inventors: Daiying Huang; Diane Subsits, both of Chicago; David May, Geneva, all of Ill.

[73] Assignee: The Pampered Chef, Ltd., Addison, Ill.

[21] Appl. No.: 09/141,157

[22] Filed: Aug. 27, 1998

[51] Int. Cl.[7] .................................................... A47J 25/00
[52] U.S. Cl. ........................................... 30/113.1; 30/130
[58] Field of Search ................................ 30/113.1–113.3, 30/130; 99/544, 554

[56] References Cited

U.S. PATENT DOCUMENTS

| | | | |
|---|---|---|---|
| 185,902 | 1/1877 | Fallows | 30/113.1 |
| 867,970 | 10/1907 | Hedborg | 30/113.1 |
| 1,293,351 | 2/1919 | Creasey | 30/113.1 |
| 1,317,263 | 9/1919 | Bishop | 99/544 |
| 1,448,652 | 3/1923 | Anderson et al. | 30/113.1 |
| 1,530,822 | 3/1925 | Gibson | 99/544 |
| 1,605,677 | 11/1926 | McCarthy | 99/554 |
| 1,669,960 | 5/1928 | Walsh | 30/113.3 X |
| 2,117,278 | 5/1938 | Ainsworth | 30/113.1 |
| 2,213,015 | 8/1940 | Parent | 30/130 |
| 2,615,245 | 10/1952 | Schaumleffel | 30/130 |
| 2,990,615 | 7/1961 | Ohler | 30/113.1 |
| 4,310,969 | 1/1982 | Cannizzaro et al. | 30/113.1 |
| 4,596,073 | 6/1986 | Ewald | 30/113.1 |
| 4,873,991 | 10/1989 | Skinner | 128/764 |

OTHER PUBLICATIONS

Norpro, 1992 Catalog, p. 6, Apple Corers.
Harold Import Co., Inc., 1992 Catalog, p. 44, Apple Corer PL/SS.
Rowoco, 1991 Catalog, p. 60, Corers.
Farberware, 1992–93 Price List, p. 18, Apple Corer.
Better Houseware Corp., Jan. 1992 Price List, p. 16, Apple Corer.
The Pampered Chef, 1994 Catalog, p. 16 Apple Corer.

*Primary Examiner*—Douglas D. Watts
*Attorney, Agent, or Firm*—Olson & Hierl, Ltd.

[57] ABSTRACT

A hand held coring device for removing the core from a piece of fruit such as an apple, pear, or the like is disclosed. The device is constructed of a tube having a wall, a central bore, first and second ends, and at least two slots defined within the wall of the tube. The slots preferably extend from the first end of the tube to an area proximate to the second end. Additionally, the second end has a cutting edge for penetrating and cutting the fruit. The present corer has a plunger which is slidably positioned within the central bore of the tube and is linked, via at least two tab connectors, to an outer ring slidably positioned about a portion of the exterior of the tube. A movable guard to protect the cutting edge at the second end, where the guard includes the outer ring slidably positioned about a portion of the exterior of the tube is also featured.

21 Claims, 3 Drawing Sheets

U.S. Patent  Mar. 7, 2000  Sheet 1 of 3  6,032,368
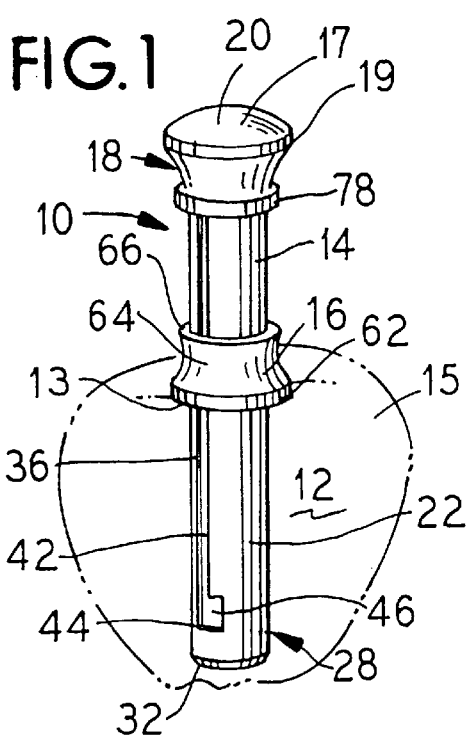
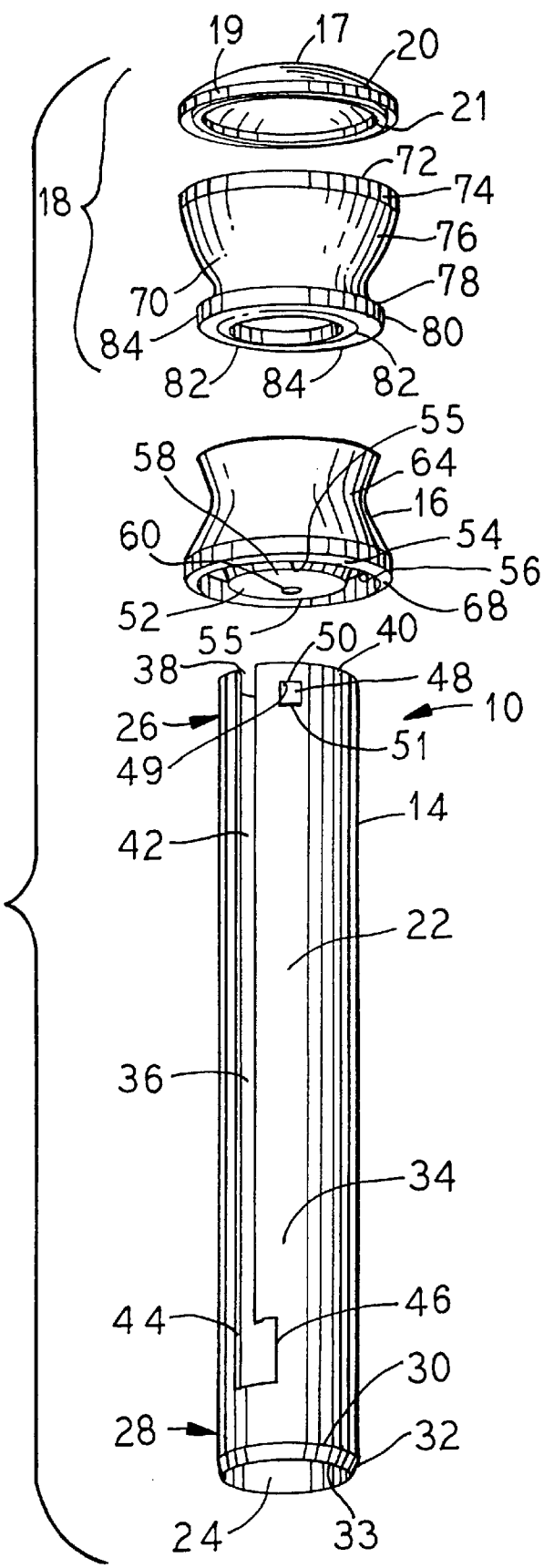

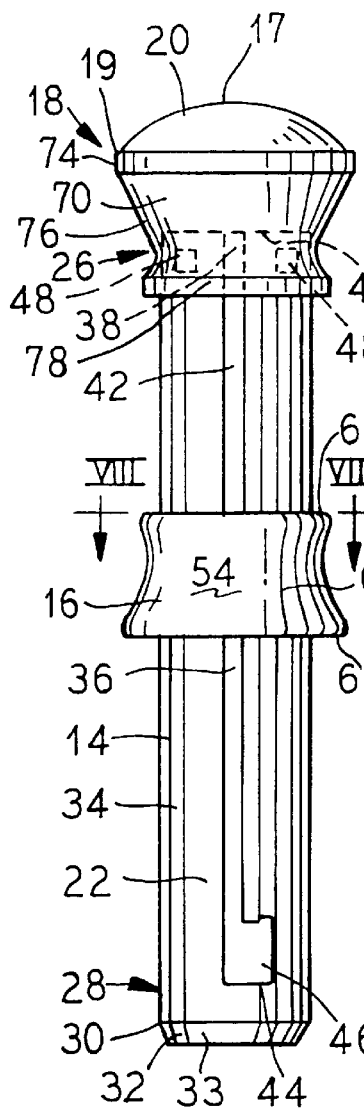

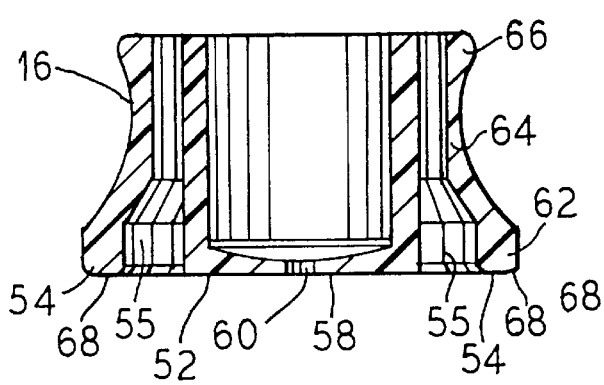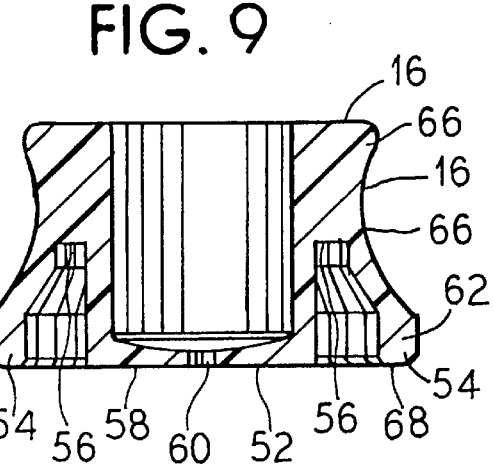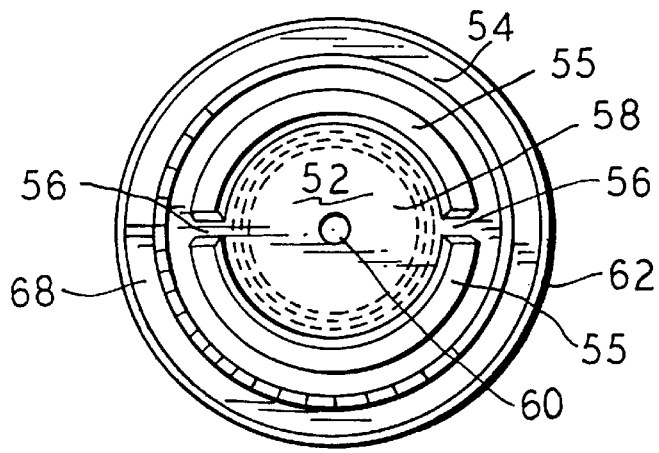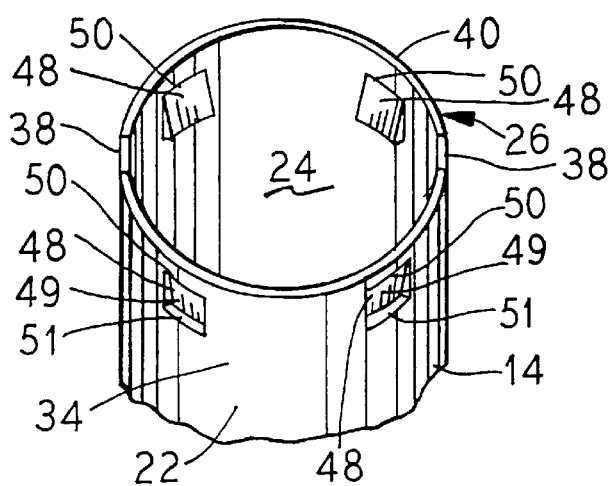

APPLE CORER

FIELD OF THE INVENTION

The present invention relates generally to a cutlery tool for removing the core from a piece of fruit. More particularly, the invention relates to an apple corer.

BACKGROUND OF THE INVENTION

When people desire to eat a piece of fruit, such as an apple, they prefer not to eat the core portion, partly because it contains the usually bitter seeds of the fruit. The removal of the core can be accomplished either by cutting (or eating) the desirable parts off the core as the fruit is consumed, or with the use of a tool, cutting out the core from the center of the fruit before it is consumed.

The latter method, known as coring the fruit, typically involves the use of a device similar to those shown in U.S. Pat. Nos. 185,902 to Fallows, and 1,293,351 to Creasey. Later, the issue of how to more easily remove the core from the core remover was addressed in U.S. Pat. No. 1,448,652 to Anderson et al. and U.S. Pat. No. 1,530,822 to Gibson.

Prior to the present invention, there have existed numerous coring devices, most of which are used principally as hand held devices. Typical designs of these devices are shown in the patents to Fallows, Creasey, Anderson et al., Gibson, and in U.S. Pat. No. 1,605,677 to McCarthy, U.S. Pat. No. 2,990,615 to Ohler, U.S. Pat. No. 4,310,969 to Cannizzaro et al., and U.S. Pat. No. 4,596,073 to Ewald.

However, until the present invention, hand held coring devices lacked some form of protection for their cutting edges. The serrated edges, sharpened points, and finely beveled cutting edges of the prior art corers were routinely exposed to the impact of other objects, which could damage and/or dull the cutting edge. At the same time these exposed edges posed a safety hazard to the hands and fingers of unwary persons.

Thus, there exists a need to provide a coring device that is capable of coring a fruit and removing the core from the device. There is further a need to provide such a device which protects the cutting edge from the damaging effects of impact, while protecting persons from being cut by the exposed blade when the device is not in use.

Accordingly, a first object of the present invention is to provide a coring device that is capable of removing the core from a piece of fruit, and thereafter removing the fruit core from the device.

A further object is to provide a coring device that protects the cutting edge thereof from impact damage.

Yet another object is to provide a coring device that protects individuals from cutting themselves on the cutting edge.

SUMMARY OF THE INVENTION

This invention provides a new and useful coring device for removing the core from a piece of fruit such as an apple, pear, or the like. The device is of the hand held variety of corers.

The present invention discloses a coring device that is both functional and aesthetically pleasing. The present corer is capable of removing the core from a piece of fruit, and thereafter removing the fruit core from the device. Additionally, the present coring device is capable of protecting the cutting edge from the damaging and/or dulling effects of impact, as well as protecting persons from being cut by the exposed blade when the device is not in use.

The present invention is comprised of a tube having a central bore, first and second edges, and at least two slots defined within a wall of the tube. The slots preferably extend from a first end of the tube to an area proximate to a second end. Additionally, the second end has a cutting edge for penetrating and cutting through the fruit.

The present invention is also preferably comprised of a core remover having a plunger which is slidably positioned within the central bore of the tube. The plunger is preferably linked, via at least two tab connectors through the slots, to an outer ring slidably positioned about a portion of the exterior of the tube. A movable guard to cover the cutting surface at the second end is also featured in a preferred embodiment.

In a preferred embodiment the cutting surface, the guard, the outer ring and the core remover are all integral to each other. Furthermore, the guard is preferably capable of being locked into a protective position when the coring device is not in use.

In use, the present invention is held in the user's hand by a handle which is preferably detachably attached to the first end of the tube.

Other and further objects, aims, features, advantages, embodiments, alternatives and the like will be apparent to those skilled in the art from the present specification, accompanying drawings and appended claims.

BRIEF DESCRIPTION OF THE DRAWINGS

In the drawings:

FIG. 1 is an environmental perspective view of one embodiment of a coring device of the present invention in the process of coring an apple (shown in phantom lines);

FIG. 2 is an exploded perspective view of the embodiment of FIG. 1;

FIG. 3 is a front elevational view of the embodiment of FIG. 1 showing the plunger mechanism descended approximately halfway;

FIG. 4 is a side elevational view (relative to FIG. 3) of the embodiment shown in FIG. 3;

FIG. 5 is a side cross-sectional view of FIG. 3 showing, however, the plunger mechanism fully descended and locked in place;

FIG. 6 is a top end view of the embodiment of FIG. 3; and

FIG. 7 is a bottom end view of the embodiment of FIG. 3;

FIG. 8 is an enlarged cross-sectional view of the plunger mechanism taken substantially along line VIII—VIII of FIG. 3;

FIG. 9 is an enlarged cross-sectional view of the plunger mechanism taken substantially along line IX—IX of FIG. 4;

FIG. 10 is an enlarged bottom view of one embodiment of the plunger mechanism, showing the outer ring, the tab connectors, and the internal plunger; and FIG. 11 is an enlarged cut-away view of the first end of one embodiment of the cutting tube.

DETAILED DESCRIPTION

Referring to FIGS. 1–11, there is seen one embodiment of a coring device 10 of the present invention. Coring device 10 is suitable for removing the entire core from a piece of fruit 12, such as the depicted apple, pear, or the like and then quickly and easily permitting the removal of the core 13 from coring device 10. Coring device 10 is also capable of safe storage, in either a horizontal or vertical position.

Referring to FIG. 2, coring device 10 is shown in the exploded view comprised of three distinct components: cutting tube 14, plunger mechanism 16, and handle 18 (cap 20 having rounded outer edge 17, planar surface 19 and inner surface 21 being an element of handle 18 as shown in FIG. 2). Each component has further functional and aesthetic features which permit it to accomplish its several goals and objects.

The first component of coring device 10 is cutting tube 14. As shown in FIGS. 2 through 5, 7, and 11, cutting tube 14 is preferably a long, narrow, hollow cylinder. In one embodiment, cutting tube 14 is comprised of a thin stainless steel wall 22, where wall 22 preferably has a wall thickness of about 0.026 inches (0.066 cm). As an alternative to the stainless steel, any known material typically used in the manufacture of cutlery, such as, for instance, aluminum, aluminum alloys, steel alloys, or other metals or alloys, may be used in the manufacture of the wall 22 of cutting tube 14. The material used, however, should be rigid enough to withstand the necessary forces associated with the utility of such a device, including those encountered in conventional cleaning methods.

The inside diameter of cutting tube 14, measured across a bore 24, is of a size sufficient to encompass the entire fruit core of a piece of very large fruit without removing too much of the edible portion from smaller fruit. Preferably, the inside diameter of cutting tube 14 is within the range of from about 0.6 inches (1.5 cm) to about 1.5 inches (3.8 cm), inclusive.

The length of cutting tube 14, similarly, should be suitable to allow its use on very large pieces of fruit, as smaller pieces of fruit present no problems in this area. Preferably, the length of cutting tube 14 is within the range of from about 3 inches (7.6 cm) to about 7 inches (17.8 cm), inclusive. Most preferably, the inside diameter of cutting tube 14 is about 0.9 inches (2.2 cm) and the length is about 5.1 inches (13 cm).

As an alternative to the "one size fits all" design described above, the present invention can be specifically designed for use with a specific fruit size. That is, large cutting tubes can used specifically to core large fruit, while small cutting tubes could be used to core small fruit.

Referring back to FIG. 2, cutting tube 14 is open at top end 26 (seen also in FIG. 11) and bottom end 28. Along the rim 30 of bottom end 28 is cutting edge 32 having a cutting surface 33. In a preferred embodiment, cutting edge 32 is integral with wall 22 and created by beveling inward the last approximate 0.1 inch (0.25 cm) of the outer surface 34 of wall 22 at bottom end 28. Preferably, the cutting edge 32 is beveled at an angle of about 12.41°, where the angle is taken between a longitudinal axis defined by the outer surface 34 of the wall 22 and the cutting surface 33. Naturally, other ways exist and are known by those skilled in the art for creating cutting edge 32. These alternative ways may be employed and should still be considered to fall within the scope and spirit of the present invention.

Another featured element is shown more clearly in FIGS. 2 and 3. Slots 36, of which there are preferably two but possibly more, are channel openings defined by the wall 22 of cutting tube 14. The width of the at least two slots 36 are preferably between the range of about 0.01 inches (0.023 cm) to about 0.3 inches (0.76 cm), inclusive, and preferably about 0.12 inches (0.3 cm). Slots 36 have an open region 38 beginning at top edge 40 of top end 26 and running down the length of cutting tube 14, forming channel 42, to a closed region 44 ending before cutting edge 32 at bottom end 28. The length, therefore, of each of the at least two slots 36 is less than and dependent upon the length of cutting tube 14. Further, the importance of the positioning of the ending of each of the at least two slots 36 will be more apparent in later discussion related to plunger mechanism 16. The at least two slots 36 are preferably aligned across bore 24 of cutting tube 14.

At the closed region 44 of each of slots 36 is adjacently positioned notches 46 defined by wall 22 of cutting tube 14, so that a portion of the notches 46 is open to the slots 36. Notches 46, of which there are two, but more are contemplated depending on the number of slots 36, is most preferably about 0.4 inches (1.0 cm) high, but at least preferably within the range of from about 0.1 inches (0.25 cm) to about 0.6 inches (1.5 cm), inclusive. Additionally, the notches 46 have a width within a range of from about 0.01 inches (0.023 cm) to about 0.3 inches (0.76 cm) where the preferable width of the at least two notches 46 is approximately equal to the width of the tab connectors, so that the at least two tab connectors can slidably engage the notches 46.

The final feature of the cutting tube 14 is cap locking tabs 48 as seen in FIGS. 2–5 and 11. In the embodiment depicted in FIG. 11, four cap locking tabs 48 are shown proximate to top end 26 of cutting tube 14. Cap locking tabs 48 are preferably integral to the wall 22 of cutting tube 14, such as, for instance, punched metal tabs having tab surface 49 which incline downward within bore 24 and remain attached at tab edge 50 opposite a tab plane 51. The size, shape, and number of the cap locking tabs 40 may vary widely as is readily apparent.

The second component of coring device 10 is plunger mechanism 16. In the embodiment of FIGS. 8, 9 and 10 showing various views of the device, it can be seen that plunger mechanism 16 is comprised of internal plunger 52, outer ring 54 defining bore openings 55 therein, and at least two tab connectors 56. As shown in FIG. 2, plunger mechanism 16 is designed to fit over cutting tube 14 such that wall 22 enters bore openings 55, internal plunger 52 enters bore 24, tab connectors 56 enter and slidably engage slots 36, and outer ring 54 encircles a portion of cutting tube 14. The three elements of plunger mechanism 16 are preferably integral to one another, as shown in FIG. 10, though other arrangements, including bonding the separate elements, are contemplated.

The feature elements of plunger mechanism 16 are designed in the present embodiment such that they are capable of freely moving up and down cutting tube 14. However, the internal plunger 52 is adequately sized to expel debris from bore 24 as it moves toward bottom end 28. It is therefore preferable that internal plunger 52 be made from a material with a low coefficient of friction and have an outer diameter slightly less than the diameter of the bore 24. This permits the internal plunger 52 to have a tight fit within bore 24 and yet still be conducive to free sliding.

The face 58 of internal plunger 52 is preferably flat, a feature which is discussed further herein. Internal plunger 52 is also equipped with drain hole 60. This allows liquids, such as juices or wash water, which may pass behind internal plunger 52, to drain without dismantling coring device 10.

Tab connectors 56, of which there are exactly as many as there are slots 36 in cutting tube 14, are preferably dimensioned to slide easily up and down slots 36, having a preferably width slightly less than the width of the slots 36. However, they are designed to fit tightly enough to prevent excessive wobble, which may lead to binding under certain circumstances. The size of tab connectors 56 should also take into consideration the dimensions of notches 46 (see "Use" below).

Outer ring 54 is used to advance and retract internal plunger 52 within bore 24. For this reason, outer ring 54 is designed to permit gripping by the user. The embodiment depicted in FIGS. 8 and 9 show a truncated bell-shaped outer ring 54 having planar base portion 62, middle (gripping) portion 64 and top portion 66. The wider base portion 62 of outer ring 54 ends in a plane 68 defined by the face 58 of plunger 52. Preferably, both outer ring 54 and internal plunger 52 extend slightly beyond cutting edge 32 when positioned at the bottom of slots 36, for purposes discussed later herein.

The third component of coring device 10 is handle 18. Referring to FIGS. 2 through 5, handle 18 can be more easily understood.

Handle 18 is comprised of main body 70 and cap 20. These parts may be manufactured from the same or different material than plunger mechanism 16. Cap 20 includes the rounded outer edge 17, planar surface 19 and inner surface 21. Similar to the plunger mechanism 16, main body 70 of handle 18 fits over cutting tube 14 at top end 26.

Main body 70 has an open top end 72 with top plane surface 74, middle gripping portion 76 and an opposing closed bottom end 78 with bottom plane surface 80. The closed bottom end 78 comprises a channel opening 82 with at least two breaks 84 therein, where the width of the channel opening expands moving away from bottom plane surface 80 towards open top end 72. The channel opening 82 is designed to allow main body 70 to be inserted onto cutting tube 14 at top end 26. The breaks 84 in the channel opening 82 correspond to the size and position of the open region 38 and slots 36. These breaks 84 serve to maintain the width of slots 36 at the open region 38 of top end 26. The depth of the channel opening 82 allows cutting tube 14 to be inserted past cap locking tabs 48.

Cap locking tabs 48 pass through the channel opening 82 of main body 70 so that tab surface 49 is compressed. However, at a certain distance within the channel opening 82, preferably about equal to the distance between tab edge 51 and top edge 26, the width of the channel opening 82 increases to allow cap locking tabs 48 to expand again (see phantom lines of FIGS. 3 and 4). At this point the main body 70 of handle 18 is locked in place and cap 20 may be attached. Cap 20 is preferably snap-fitted onto the open top end 72 of main body 70, so that inner edge 21 and open top end 72 are connected, however other methods, such as gluing, bonding or the like, are contemplated.

Use of Cutting Device

Referring back to FIG. 1, the piece of fruit 12 having a core 13, such as an apple, pear, or the like, should preferably be placed upright on a firm, sturdy cutting surface (not shown). Cutting boards, blocks, stands or tables are preferred (because of the possible sharpness of cutting edge 32, the fruit 12 should not be held in hand while coring). Coring device 10 may then be centered over the fruit 12 at the core 13, being sure plunger mechanism 16 is in the unlocked position (see "Storage" below) with plunger mechanism 16 near top end 26 and in proximity to the handle 18.

While holding the coring device 10 vertically and stabilizing the fruit 12 from the sides, downward pressure should be exerted on handle 18, usually at rounded outer edge 17. Some initial twisting motion may be necessary to penetrate the fruit peel 15. After initial penetration, the applied force should be continued until cutting edge 32 has exited the opposing end of the fruit, resulting in wall 22 surrounding core 13, so that core 13 now rests in bore 24. At this point coring device 10 may be removed from fruit 12.

To remove the core 13 from the bore 24 of the coring device 10, plunger mechanism 16 is gripped about outer ring 54, preferably at the middle portion 64, and advanced towards the bottom end 28 of cutting tube 14. This results in tab connectors 56 slidably advancing in slots 36 towards the closed region 44. The face 58 of the plunger mechanism 16 engages the core 13, and discharges it, and any other fruit debris, from bottom end 28.

Storage of Cutting Device

After coring, coring device 10 can be easily cleaned and stored. It is contemplated that handle 18 may be removed from top end 26 and the plunger mechanism 16 withdrawn from the bore 24 for cleaning. After cleaning, plunger mechanism 16 should be advanced towards the bottom end 28 of cutting tube 14. With a twist of outer ring 54, tab connectors 56 enter each notch 46. The slidably engagement of tab connectors 56 with notches 46 acts as a locking mechanism in the present invention. A friction fit will protect against accidental unlocking.

In this locked position, outer ring 54 covers the cutting edge 32 and a portion of the outer surface 34 and serves as a movable guard 86 therefor. Likewise, internal plunger 52 prevents objects from entering bore 24 where they may impact cutting edge 32. In this manner, plunger mechanism 16 acts as a movable guard 86 for cutting edge 32.

Moreover, the even surface provided by the plane 68 of outer ring 54 in one embodiment, and additionally the face 58 of internal plunger 52 in another embodiment, provides a base 88 (depicted in FIG. 5) that allows the coring device 10 to be stood vertically. This base 88 for standing the coring device 10 permits storage on a counter top or shelf for future use.

If coring device 10 is relegated to a cutlery drawer, the movable guard 86 protects cutting edge 32 against impact from other tools. Additionally, the risk of having a hand or finger cut by coring device 10 when digging through such a storage drawer is significantly reduced, if not eliminated, by movable guard 86.

By virtue of the present invention, the described objectives are met. A coring device 10 is described that is capable of removing the core 13 from a piece of fruit 12 using cutting edge 32 advanced through the fruit 12 by means of force applied to handle 18. Further, the corer device 10 provides for removal of the core 13 from the bore 24 by advancing the plunger mechanism 16 towards bottom end 28.

Furthermore, the present invention protects against damage to the cutting edge 32 by using the plunging mechanism 16 as a movable guard 86. This allows for safe storage of the coring device 10, additionally providing the added feature of protecting persons from inadvertently cutting themselves on cutting edge 32.

The foregoing illustrates the general principles of this invention. However, since numerous modifications and changes will be readily apparent to those skilled in the art based on this description, it is not desired to limit the invention to the exact construction and operation shown and described. Accordingly, the scope of this invention includes other modifications and equivalents that fall within the scope of the foregoing description and the following claims.

What is claimed is:

1. A coring device comprising:
   a tube having a wall defining a central bore, first and second ends, at least two slots defined within the wall and extending from the first end to an area proximate to the second end, and a cutting edge at the second end;

a movable guard having an outer ring slidably positioned about a portion of an exterior of the tube and at least two tab connectors extending through and slidably engaging the at least two slots;

a mechanism for locking the movable guard so that the guard is retained in a protective position about the cutting edge; and a handle detachably connected to the first end of the tube.

2. The coring device of claim 1 including a core remover slidably positioned within the central bore and connected to the at least two tab connectors.

3. The coring device of claim 2 wherein the core remover further includes a contact surface.

4. The coring device of claim 3 wherein the contact surface is substantially flat and formed with at least one drain hole.

5. The coring device of claim 3 wherein the movable guard further includes a gripping surface.

6. The coring device of claim 2 wherein the handle includes a rounded first end and a second end opposite the rounded first end.

7. The coring device of claim 6 wherein the handle second end is formed with a channel for detachably engaging the tube first end.

8. The coring device of claim 7 wherein the channel is formed with at least two breaks in movable communication with the at least two slots so that a width of the slots may be maintained.

9. The coring device of claim 8 wherein the handle further includes a gripping surface.

10. The coring device of claim 2 wherein the cutting edge is a beveled edge.

11. The coring device of claim 10 wherein the bevel edge is integral with the wall.

12. The coring device of claim 2 wherein the wall is comprised of a thin material.

13. The coring device of claim 12 wherein the thin material is generally rigid.

14. The coring device of claim 13 wherein the thin material is selected from the group consisting of stainless steel, aluminum, aluminum alloys and steel alloys.

15. The coring device of claim 2 wherein the locking mechanism includes at least two notches in communication with the at least two slots.

16. The coring device of claim 15 wherein the locking mechanism further includes a portion of the at least two notches open to the at least two slots.

17. The coring device of claim 16 wherein the locking mechanism further includes the at least two tabs slidably engaging the at least two notches, so that the guard is retained about the cutting edge in a protective position.

18. The coring device of claim 2 wherein the guard is integral to the core remover.

19. The coring device of claim 18 wherein the guard is integral to the outer ring.

20. The coring device of claim 2 for comprising a base for standing said coring device vertically.

21. The coring device of claim 20 wherein the base for standing said coring device vertically includes the core remover.

\* \* \* \* \*